Jan. 1, 1952　　　　　M. MAAT　　　　　2,580,449
VEHICLE DRIVE CONTROL MECHANISM

Filed April 1, 1948　　　　　3 Sheets-Sheet 1

Marinus Maat
INVENTOR.

Jan. 1, 1952 M. MAAT 2,580,449
VEHICLE DRIVE CONTROL MECHANISM
Filed April 1, 1948 3 Sheets-Sheet 2
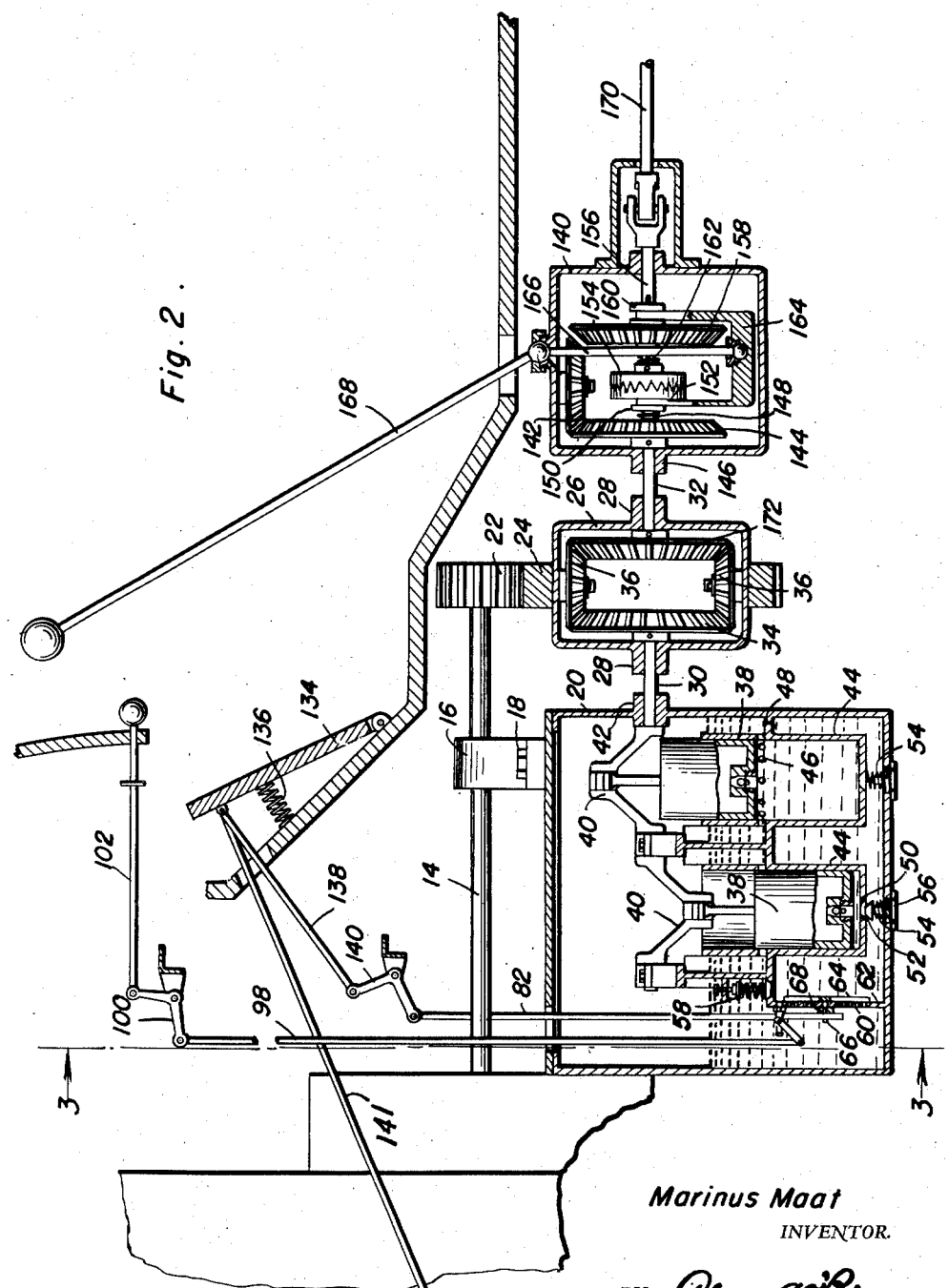
Marinus Maat
INVENTOR.

Jan. 1, 1952            M. MAAT            2,580,449
VEHICLE DRIVE CONTROL MECHANISM
Filed April 1, 1948            3 Sheets—Sheet 3
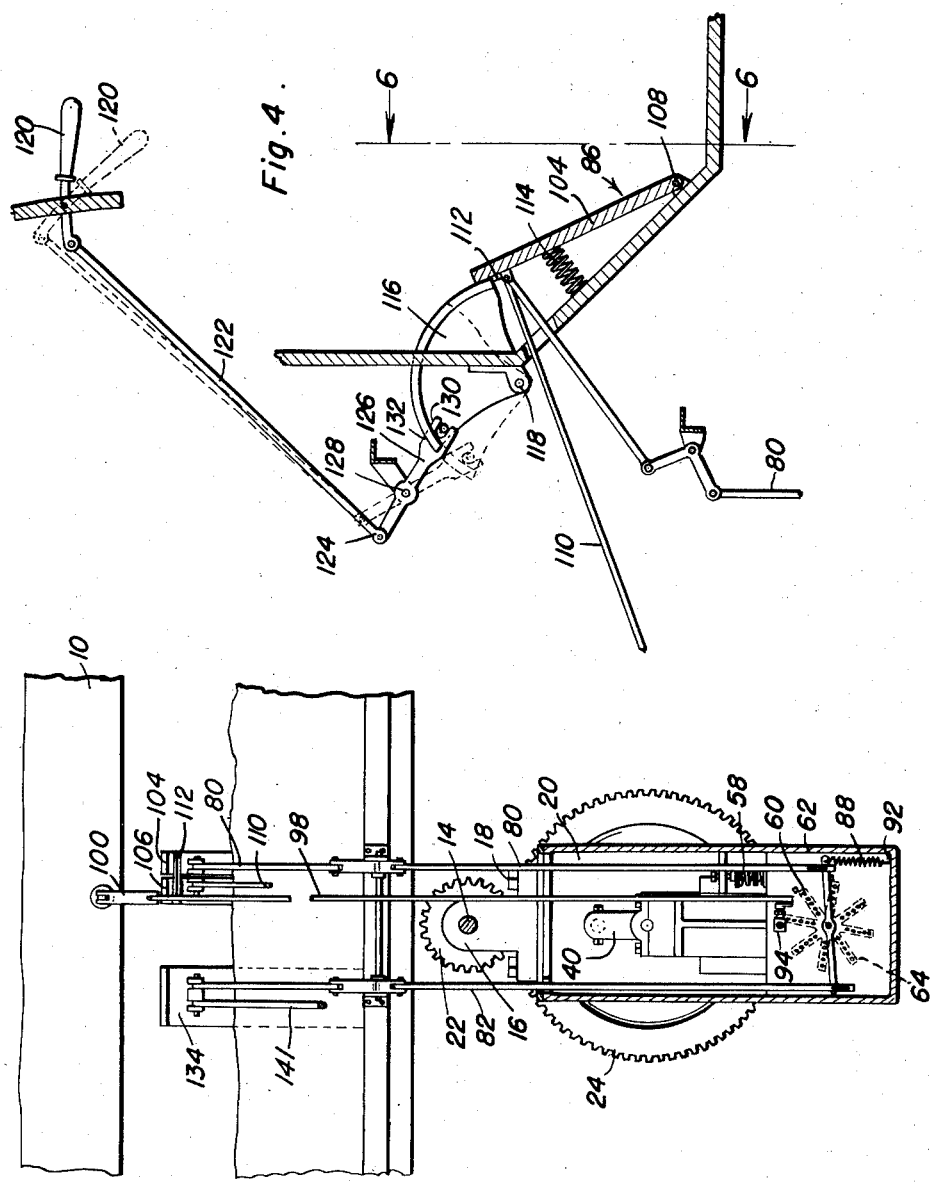
Marinus Maat
*INVENTOR.*

Patented Jan. 1, 1952

2,580,449

UNITED STATES PATENT OFFICE 2,580,449

VEHICLE DRIVE CONTROL MECHANISM

Marinus Maat, Paramaribo, Dutch West Indies

Application April 1, 1948, Serial No. 18,393

1 Claim. (Cl. 74—778)

This invention relates to a motor vehicle drive and has as its primary object the modification of the usual accelerator means.

Another object of the invention is to permit the vehicle to be more simply operated and is especially valuable when used by novice drivers.

Yet another object of the invention is to provide means whereby the vehicle may be driven either forward or in reverse, using the same principles of the invention, and accomplishing this by a simple shifting of appropriate parts.

And yet another object of the invention is to provide a device that is simple to install, durable in construction, and economical in manufacture.

With these and other objects in view the invention consists in the novel construction, arrangement and formation of parts, as will be hereinafter more specifically described, claimed and illustrated in the drawings, in which;

Figure 2 is an enlarged sectional view of the invention;

Figure 3 is a transverse view of the invention taken substantially along lines 3—3 of Figure 2;

Figure 4 is an enlarged detail of the control mechanism;

Figure 1:
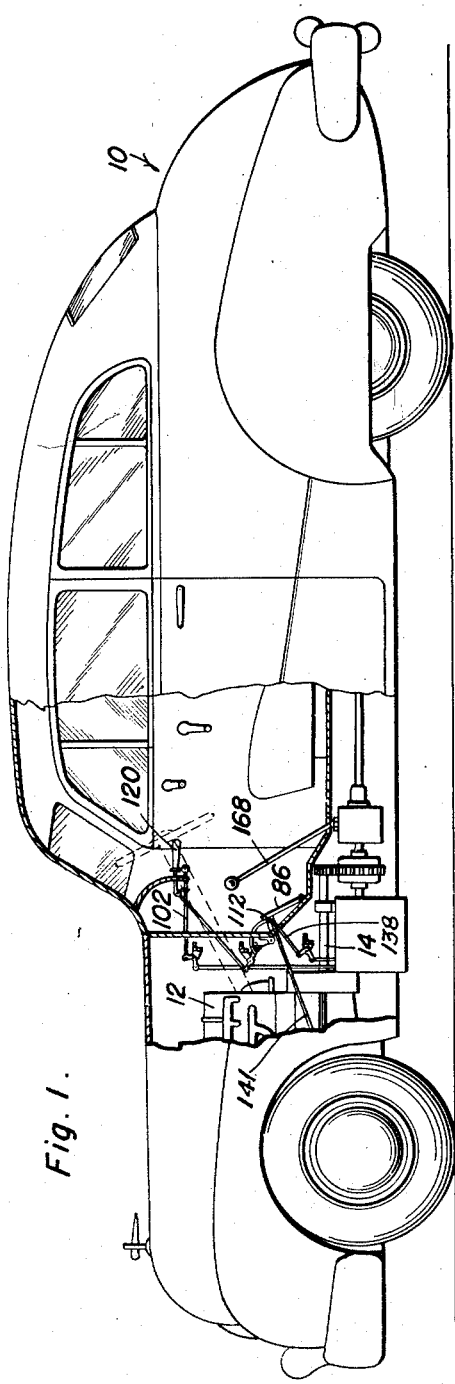
Figure 1 is a side elevational view of an automobile with a section broken away to show the invention in operative position.

Referring to Figure 1, there is shown an automobile 10 of usual construction and including an engine 12 with a power take off shaft 14. As is best illustrated in Figures 2 through 6, shaft 14 is rotatably mounted in bearing 16 secured by suitable means such as bolts 18 to a large tank 20. A pinion 22 is secured to the end of the shaft and engages sprocket wheel 24 on differential housing 26, causing differential housing 26 to rotate on bearings 28 on shafts 30 and 32. Rotation of wheel 24 causes bevel gear or idler 34 through bevel gear 36, to operate valved pistons 38 through rotation of shaft 30 secured to gear 34 and piston arms 40 and entering tank 20 through suitable bearing means 42. Pistons 38 reciprocate in cylinders 44 apertured along the medial periphery thereof at 46. Cylinders 44 are mounted within a smaller tank 48 contained within large tank 20 and includes apertures 50 in the lower end thereof acting as valve seats for valves 52 urged into seating position by means of coil springs 54, valves 52 being inserted through the floor of tank 20 and retained by threaded bolts 56. Tank 20 includes a pressure relief valve 58 of usual construction to enable oil to escape in the event that an excess pressure is built up in tank 48.

When a piston is in raised position, illustrated in Figure 2, oil in tank 20 enters through apertures 46, by the vacuum produced, into cylinder 44 and the downward stroke causes the oil to be forced out through apertures 52, overcoming the upward pressure exerted by spring 54 and forcing the fluid through apertures 60 (Figure 5) in the front wall 62 of tank 48. Actuation of both pistons causes a continuous circulation of oil and the total amount of oil sent out through tank 48 is equal to the oil intake of pistons 38.

A star wheel 64 is mounted on shaft 66 rotatively held in bearings 68 on wall 62. A lever 70 is pivotally mounted on shaft 66 to move star wheel 64 into alignment with apertures 60, as is shown in Figure 3, thereby closing them, or alternatively into the dotted line position illustrated in Figure 5, where the apertures are free to transmit pumped oil. The movement of wheel 64 is such that apertures 60 may be adjusted to vary from open to closed positions. Stops 72 and 74 on wall 62 limit the rotational movement of the star wheel and the upward and downward movements of lever 70. At each end of lever 70 are pins 76 and 78 engaging arms 80 and 82 respectively. Arm 80 is slotted at its lower extremity at 84 to receive pin 76 and is connected at its upper end to pedal part 104. Coil spring 88 is secured to lever 70 at 90 and to the bottom of tank 20 by means of an eye 92, exerting a constant downward pull on lever 70.

A valve regulator 94 is mounted on wall 62 and is connected by means of link 96 to rod 98 secured by bell crank lever 100 to a longitudinally extending rod 102 connected to the vehicle dashboard. On traveling up a hill, valve 94 is opened and gas pedal 86 is depressed as much as possible, causing the motor to work under "low gear" speed conditions. A part of the oil will run through valve 94 to slow down pistons 38 to reduce the speed of the vehicle, the acceleration decreasing according to the quantity of oil released by valve 94.

Figure 6:
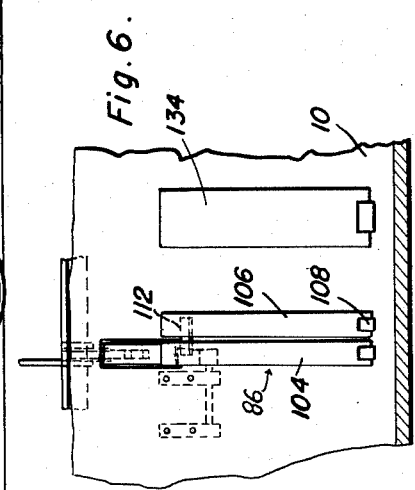
Figure 6 is a transverse view of the control mechanism taken along lines 6—6 of Figure 4.
Figure 5:
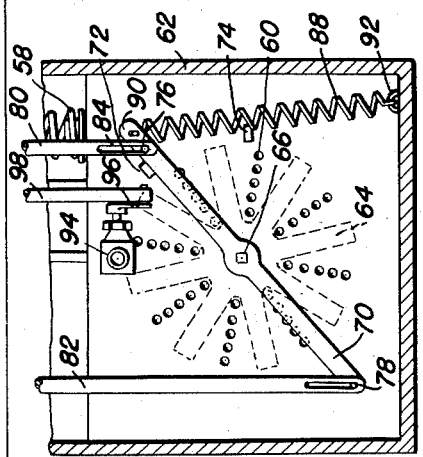
Figure 5 is an enlarged front view of the small tank and illustrating star wheel control means.

As is best seen in Figure 6, gas pedal 86 is of two parallel parts 104, 106, pivoted at 108 to the floor of the car. The width of 104 and 106 will equal the width of the average foot pedal, or may be varied as desired. As shown in Figure 4, a rod 110 leads to the fuel supply. A plate 112 is rigidly attached to pedal part 106 as is a tension spring 114. The plate 112 also extends under pedal part 104 but is not connected thereto, so that member 106 is movable without actuating member 104. A quadrant 116 is pivoted at 118 and quadrant 116 is connected to a hand brake control lever 120 mounted on the dashboard of the vehicle, and is connected thereto by means of coupling rod 122 pivoted at 124 to a link 126 pivoted at its midpoint at 128 and, link 126 terminating in a bifurcated end 130 extending through an open slot 132 on quadrant 116. Thus, as seen in dotted lines, actuation of the hand brake control lever 120 thereto releases quadrant 116 from engagement with pedal 104, and in full line position lever 120 prevents movement thereof. With a two section pedal, the motor will operate without disturbing the circulation of fluid and the release of brake lever 120 will not start the vehicle as only pedal 106 which is connected to the fuel supply, can be used. Pedal 86 serves a double function. It regulates the supply of fuel to the motor independently and controls apertures 60 in tank 20 and by closing them, shaft 30 is stopped from rotating, rotation being transmitted to the rear wheels of the vehicle.

A brake pedal 134 is pivotally secured to the floor of the car and is urged upwardly by spring 136. Rod 138 extends from pedal 134 for connection by crank lever 139 to arm 82 on lever 70. When brake pedal 134 is depressed, a brake rod 141 is shifted and the wheel 64 is rotated to the position shown in Figure 5 and apertures 60 are wide open thereby allowing the free flow of fluid and stopping the vehicle by the usual wheel brakes. In other words, the differential 26 rotates freely and wheel brakes (not illustrated) are applied simultaneously as a result of actuation of a brake rod 141.

To replace the accelerator, the construction illustrated in Figure 2 is used. A housing 140 includes bevel gears 142 and 144 in meshing engagement. Gear 144 is mounted on shaft 32 extending through bearings 146. Shaft 32 includes a spring 148 between gear 144 and plate 150 to constantly urge clutch member 152 into engagement with clutch member 154. Clutch member 154 is in turn mounted on shaft 156 which receives thereon bevel gear 158 and plate 160 as well as a spring 162 for urging clutch member 154 into locking engagement with clutch member 152. A U-shaped arm 164 has a shift lever or rod 166 secured thereto in operative connection with a rod 168 extending into the vehicle. Shaft 156 is in universal connection with a shaft 170 connected to the rear wheels of the vehicle. It is to be noted that bevel gears 142 and 144 are in constant engagement while gear 158 normally rides free. However, when lever 168 is pulled into reverse, U-arm 164 moves clutch member 152 out of engagement with clutch member 154 while the bevel gear 158 then is engaged with the pinion 142 and is rotated by pinion 142 to move the vehicle in reverse. Thus, lever 168 is always in forward or in reverse, but never in neutral. In this way gear 172 in differential housing 26 is stationary and pistons 38 continue to operate.

From the foregoing the operation of the device is readily apparent. On starting the motor, oil is pumped into tank 48, and gear 34 rotates with shaft 30. Pedal 106 is raised and lever 70 is against block 72 leaving apertures 60 uncovered. On pressing gas pedal 86, spring 88 pulls lever 70 down and the innermost row of apertures 60 are closed by star wheel 64. Oil enters under pressure and pistons 38 and gear 34 rotate slowly. As pressure on pedal 86 causes the motor to increase speed, gears 36 transfer the difference between rotation of shaft 30 and the increased action of engine 12 to bevel gear 172 and the vehicle begins to move. Increase in depression of gas pedal 86 causes more apertures 60 to be shut off with a corresponding decrease in actuation of pistons 38 and in turn a greater transmission of power to gear 172. By simply releasing pedal 86, power is decreased and the vehicle is slowed down.

As a safety measure, brake pedal 134 can be actuated to pivot lever 70 to the left to open apertures 60 and allow free circulation of fluid through tanks 48 and 20, thereby reducing acceleration.

Shaft 32 rotates pinions 144 in engagement with pinions 142 to drive the vehicle forward. Movement of lever 162 disengages pinion 144 from 142 and causes gear 142 to mesh with gear 158 on shaft 156. Power is transmitted to the rear wheels via shaft 170 and the vehicle now moves in reverse.

Obviously other types of pump means, such as rotary pumps or the like may be substituted.

From the above, it is seen that the several objects of the invention are attained and other advantageous results achieved.

As many modifications of the embodiment above illustrated might be made without departing from the spirit or scope of the present invention, it is intended that the above description and accompanying claim be illustrative and not in a limitive sense.

Having described the invention, what is claimed as new is:

In a vehicle including a motor having a throttle, a two-part pedal comprising two treadle parts, a plate attached to the bottom of one treadle part and extending transversely therefrom to be below the other treadle part for engagement by the latter, means connecting one treadle part to the throttle, a fluid tank, a cylinder with a coacting piston in said tank, inlet apertures in an intermediate portion of said cylinder, a valve outlet at one end of the cylinder, closure means for said outlet having a portion threaded through an adjacent wall of said tank, a pivoted lever secured to said closure means, and an actuating rod connecting the second treadle part of said pedal to said lever for actuating said closure means and a differential assembly having one gear operatively connected with said piston, an opposed gear connected to a drive shaft, and a housing rotatively mounted on the vehicle and carrying satellite gears in mesh with the other gears.

MARINUS MAAT.

REFERENCES CITED

The following references are of record in the file of this patent:

UNITED STATES PATENTS

| Number | Name | Date |
|---|---|---|
| 1,620,100 | Hoxton | Mar. 8, 1927 |
| 1,747,497 | Weylandt | Feb. 18, 1930 |
| 1,800,062 | Fordyce | Apr. 7, 1931 |
| 2,383,690 | Sklovsky et al. | Aug. 28, 1945 |

FOREIGN PATENTS

| Number | Country | Date |
|---|---|---|
| 585,734 | France | Dec. 13, 1924 |